US010237267B2

(12) United States Patent
Li (10) Patent No.: US 10,237,267 B2
(45) Date of Patent: Mar. 19, 2019

(54) RIGHTS CONTROL METHOD, CLIENT, AND SERVER (71) Applicant: Huawei Technologies Co., Ltd., Shenzhen, Guangdong (CN)

(72) Inventor: Ting Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 15/304,239

(22) PCT Filed: Apr. 15, 2014

(86) PCT No.: PCT/CN2014/075426
§ 371 (c)(1),
(2) Date: Oct. 14, 2016

(87) PCT Pub. No.: WO2015/157924
PCT Pub. Date: Oct. 22, 2015

(65) Prior Publication Data
US 2017/0041310 A1 Feb. 9, 2017

(51) Int. Cl.
*H04L 29/06* (2006.01)
*G06F 17/30* (2006.01)
(Continued)

(52) U.S. Cl.
CPC ...... *H04L 63/083* (2013.01); *G06F 17/30867* (2013.01); *G06F 21/31* (2013.01);
(Continued)

(58) Field of Classification Search
CPC ..... H04L 63/083; H04L 63/101; H04L 63/08; H04L 63/105; H04L 29/06; H04W 12/08;
(Continued)

(56) References Cited

U.S. PATENT DOCUMENTS 7,596,562 B2 9/2009 Lee et al.
8,646,060 B1* 2/2014 Ben Ayed ........... H04L 63/0853
726/9

(Continued)

FOREIGN PATENT DOCUMENTS

CN 1485746 A 3/2004
CN 1635733 A 7/2005
(Continued)

OTHER PUBLICATIONS

Wu et al., "Analysis and Application of Android Security Mechanism", Machinery Industry Press, dated May 1, 2013, total 10 pages.

*Primary Examiner* — Abu S Sholeman (57) ABSTRACT

The present invention relates to the field of mobile communications technologies, and in particular, to a right control method, a client, and a server, so as to resolve a technical problem in the prior art that there is no method that can better control a right of a user. In embodiments of the present invention, the server can send right information corresponding to a login account to the client, so that the client controls access right of the login account, which does not cause too much burden on the server; a manner is more direct in which the client controls the access right of the login account, thereby reducing control time and generating higher control efficiency.

8 Claims, 4 Drawing Sheets (51) Int. Cl.
*G06F 21/31* (2013.01)
*G06F 21/62* (2013.01)
*H04W 12/06* (2009.01)
*H04W 12/08* (2009.01)

(52) U.S. Cl.
CPC .......... *G06F 21/6281* (2013.01); *H04L 63/08* (2013.01); *H04L 63/101* (2013.01); *H04L 63/105* (2013.01); *H04W 12/06* (2013.01); *H04W 12/08* (2013.01)

(58) Field of Classification Search
CPC .............. H04W 12/06; G06F 17/30867; G06F 21/6281; G06F 21/31; G06F 17/30
USPC .......................................................... 726/1, 7
See application file for complete search history.

(56) References Cited

U.S. PATENT DOCUMENTS

| | | | | |
|---|---|---|---|---|
| 8,712,568 | B2* | 4/2014 | Nakagawa | G06F 11/073 438/107 |
| 9,591,481 | B1* | 3/2017 | Fisher | H04W 76/10 |
| 9,602,502 | B2* | 3/2017 | Zhang | H04L 63/083 |
| 2005/0166765 | A1* | 8/2005 | Lyall, III | A47J 31/002 99/280 |
| 2005/0240756 | A1* | 10/2005 | Mayer | G06F 9/4418 713/2 |
| 2005/0262549 | A1 | 11/2005 | Ritt et al. | |
| 2007/0128899 | A1* | 6/2007 | Mayer | G06F 9/4406 439/152 |
| 2008/0222569 | A1* | 9/2008 | Champion | G06F 3/0482 715/834 |
| 2010/0250389 | A1 | 9/2010 | Augustin et al. | |
| 2011/0219229 | A1* | 9/2011 | Cholas | G06F 21/00 713/168 |
| 2011/0265188 | A1 | 10/2011 | Ramaswamy et al. | |
| 2013/0232425 | A1* | 9/2013 | Lippmann | G06F 3/048 715/741 |
| 2014/0090035 | A1* | 3/2014 | Kodama | G06F 21/31 726/6 |
| 2015/0172267 | A1* | 6/2015 | Sato | H04L 63/08 726/3 |
| 2016/0044021 | A1* | 2/2016 | Thibadeau, Sr. | H04L 63/0807 713/159 |
| 2017/0097983 | A1* | 4/2017 | Morimoto | G06F 17/30598 |

FOREIGN PATENT DOCUMENTS

| | | |
|---|---|---|
| CN | 101056179 | 10/2007 |
| CN | 101083527 A | 12/2007 |
| CN | 101441688 A | 5/2009 |
| CN | 102014134 A | 4/2011 |
| CN | 201937612 U | 8/2011 |
| CN | 103001803 A | 3/2013 |
| CN | 103593602 A | 2/2014 |
| EP | 2409217 A1 | 1/2012 |

\* cited by examiner

RIGHTS CONTROL METHOD, CLIENT, AND SERVER

CROSS REFERENCE TO RELATED APPLICATIONS

The present application claims priority under 35 U.S.C. § 365 to International Patent Application No. PCT/CN2014/075426 filed Apr. 15, 2014 which is incorporated herein by reference in its entirety.

TECHNICAL FIELD

The present invention relates to the field of mobile communications technologies, and in particular, to a right control method, a client, and a server.

BACKGROUND

The Web (web) has been widely applied in application systems of various organizations, such as a government and an enterprise. In these web application systems, it is a very important function that different users are controlled to have different access rights for different resources.

In the prior art, generally there are the following several methods for controlling access right of a user:

1. On a web page, a right element such as a button or a hyperlink can be displayed, and all users can see the right element and initiate an operation. After receiving a request sent by a user, a web server performs right determining according to a URL (uniform resource locator); if the user has no right, the web server intercepts access and returns error information to the user.

In this solution, only after performing an operation, the user can know whether the user has a right, and in the solution, various operation links of a system are exposed to a user who has no right, which may lead to a potential security risk of the system.

In addition, all processing in the solution is completed on the server, which increases processing pressure on the server.

2. An active web technology is used, such as JSP (Java server pages) or ASP (Active Server Page, active server page); on a web page, a segment of code is implanted into each right element, such as a button or a hyperlink; whether these right elements are displayed is controlled by using the implanted code. By implanting the code, a relevant right element is not displayed to a user who has no right.

This solution is relatively complex during implementation and requires a large amount of code to be implanted, and a server is also under too much processing pressure.

SUMMARY

Embodiments of the present invention provide a right control method, a client, and a server, so as to resolve a technical problem in the prior art that there is no method that can better control a right of a user.

A first aspect of the present invention provides a right control method, including:

acquiring, by a client, login information input by a user;

sending, by the client, the login information to a server, where the login information is used by the server to query right information corresponding to the login information; and receiving, by the client, the right information sent by the server, and controlling, by the client, access right of a login account according to the right information, where the login account is an account corresponding to the login information.

With reference to the first aspect, in a first possible implementation manner of the first aspect, before the acquiring, by a client, login information input by a user, the method further includes:

displaying, by the client, a login interface, where the login interface is a login interface of a website, or the login interface is a login interface of an application; and the acquiring, by a client, login information input by a user includes: acquiring, by the client, the login information that the user inputs by using the login interface.

With reference to the first possible implementation manner of the first aspect, in a second possible implementation manner of the first aspect, when the login interface is a login interface of a website, the right information corresponds to the website; or when the login interface is a login interface of an application, the right information corresponds to the application.

With reference to the first possible implementation manner or the second possible implementation manner, in a third possible implementation manner, the controlling, by the client, access right of a login account according to the right information includes:

determining, by the client, information about a right element included in each interface of the website or the application;

determining, by the client according to the right information, whether there is information about a right element, wherein the information is in the determined information about a right element but is not included in the right information; and when there is information about a right element that is not included in the right information, forbidding, by the client, displaying of the right element corresponding to the information about the right element that is not included in the right information.

With reference to the first possible implementation manner of the first aspect or the second possible implementation manner of the first aspect, in a fourth possible implementation manner of the first aspect, the controlling, by the client, access right of a login account according to the right information includes:

determining, by the client, information about a right element included in each interface of the website or the application;

determining, by the client according to the right information, whether there is information about a right element, wherein the information is in the determined information about a right element but is not included in the right information; and when there is information about a right element that is not included in the right information, forbidding, by the client, enabling of the right element corresponding to the information about the right element that is not included in the right information.

A second aspect of the present invention provides a right control method, including:

receiving, by a server, login information sent by a client and input by a user;

querying, by the server according to the login information, right information corresponding to the login information; and sending, by the server, the right information to the client, where the right information is used by the client to control access right of a login account, and the login account is an account corresponding to the login information.

With reference to the second aspect, in a first possible implementation manner of the second aspect, the receiving, by a server, login information sent by a client and input by a user includes: receiving, by the server, the login information that is sent by the client and input by the user by using a login interface, where the login interface is a login interface of a website, or the login interface is a login interface of an application.

With reference to the first possible implementation manner of the second aspect, in a second possible implementation manner of the second aspect, when the login interface is a login interface corresponding to a website, the right information corresponds to the website; or when the login interface is a login interface corresponding to an application, the right information corresponds to the application.

A third aspect of the present invention provides a client, including:

an acquiring module, configured to acquire login information input by a user;

a sending module, configured to send the login information to a server, where the login information is used by the server to query right information corresponding to the login information; and a control module, configured to receive the right information sent by the server, and control access right of a login account according to the right information, where the login account is an account corresponding to the login information.

With reference to the third aspect, in a first possible implementation manner of the third aspect, the acquiring module is specifically configured to: display a login interface, where the login interface is a login interface of a website, or the login interface is a login interface of an application; and acquire the login information that the user inputs by using the login interface.

With reference to the first possible implementation manner of the third aspect, in a second possible implementation manner of the third aspect, when the login interface is a login interface corresponding to a website, the right information corresponds to the website; or when the login interface is a login interface corresponding to an application, the right information corresponds to the application.

With reference to the first possible implementation manner of the third aspect or the second possible implementation manner of the third aspect, in a third possible implementation manner of the third aspect, the control module includes:

a determining submodule, configured to determine information about a right element included in each interface of the website or the application;

a judging submodule, configured to determine, according to the right information, whether there is information about a right element, wherein the information is in the determined information about a right element but is not included in the right information; and a display forbidding submodule, configure to: when there is information about a right element that is not included in the right information, forbid displaying of the right element corresponding to the information about the right element that is not included in the right information.

With reference to the first possible implementation manner of the third aspect or the second possible implementation manner of the third aspect, in a fourth possible implementation manner of the third aspect, the control module includes:

a determining submodule, configured to determine information about a right element included in each interface of the website or the application;

a judging submodule, configured to determine, according to the right information, whether there is information about a right element, wherein the information is in the determined information about a right element but is not included in the right information; and an enabling forbidding submodule, configure to: when there is information about a right element that is not included in the right information, forbid enabling of the right element corresponding to the information about the right element that is not included in the right information.

A fourth aspect of the present invention provides a server, including:

a receiving module, configured to receive login information sent by a client and input by a user;

a querying module, configured to query, according to the login information, right information corresponding to the login information; and a sending module, configured to send the right information to the client, where the right information is used by the client to control access right of a login account, and the login account is an account corresponding to the login information.

With reference to the fourth aspect, in a first possible implementation manner of the fourth aspect, the receiving module is specifically configured to receive the login information that is sent by the client and input by the user by using a login interface, where the login interface is a login interface of a website, or the login interface is a login interface of an application.

With reference to the first possible implementation manner of the fourth aspect, in a second possible implementation manner of the fourth aspect, when the login interface is a login interface corresponding to a website, the right information corresponds to the website; or when the login interface is a login interface corresponding to an application, the right information corresponds to the application.

A fifth aspect of the present invention provides a client, including: a memory, an input device, a receiver, a transmitter, and a processor, where: the memory connects to the processor, the input device connects to the processor, the receiver connects to the processor, and the transmitter connects to the processor;

the memory is configured to store an instruction;

the input device is configured to acquire login information input by a user;

the transmitter is configured to send the login information to a server, where the login information is used by the server to query right information corresponding to the login information;

the receiver is configured to receive the right information sent by the server; and the processor is configured to execute the instruction, and control access right of a login account according to the right information, where the login account is an account corresponding to the login information.

With reference to the fifth aspect, in a first possible implementation manner of the fifth aspect, the client further includes an output device, where the output device connects to the processor;

the output device is configured to display a login interface, where the login interface is a login interface of a website, or the login interface is a login interface of an application; and the input device is specifically configured to acquire the login information that the user inputs by using the login interface.

With reference to the first possible implementation manner of the fifth aspect, in a second possible implementation manner of the fifth aspect, when the login interface is a login interface corresponding to a website, the right information corresponds to the website; or when the login interface is a login interface corresponding to an application, the right information corresponds to the application.

With reference to the first possible implementation manner of the fifth aspect or the second possible implementation manner of the fifth aspect, in a third possible implementation manner of the fifth aspect, the processor is specifically configured to: execute the instruction; determine information about a right element included in each interface of the website or the application; determine, according to the right information, whether there is information about a right element, wherein the information is in the determined information about a right element but is not included in the right information; and when there is information about a right element that is not included in the right information, forbid displaying of the right element corresponding to the information about the right element that is not included in the right information.

With reference to the first possible implementation manner of the fifth aspect or the second possible implementation manner of the fifth aspect, in a fourth possible implementation manner of the fifth aspect, the processor is specifically configured to: execute the instruction; determine information about a right element included in each interface of the website or the application; determine, according to the right information, whether there is information about a right element, wherein the information is in the determined information about a right element but is not included in the right information; and when there is information about a right element that is not included in the right information, forbid enabling of the right element corresponding to the information about the right element that is not included in the right information.

A sixth aspect of the present invention provides a server, including: a memory, a receiver, a processor, and a transmitter, where: the memory connects to the processor, the receiver connects to the processor, and the transmitter connects to the processor;

the memory is configured to store an instruction;

the receiver is configured to receive login information sent by a client and input by a user;

the processor is configured to execute the instruction, and query, according to the login information, right information corresponding to the login information; and the transmitter is configured to send the right information to the client, where the right information is used by the client to control access right of a login account, and the login account is an account corresponding to the login information.

With reference to the sixth aspect, in a first possible implementation manner of the sixth aspect, the receiver is specifically configured to receive the login information that is sent by the client and input by the user by using a login interface, where the login interface is a login interface of a website, or the login interface is a login interface of an application.

With reference to the first possible implementation manner of the sixth aspect, in a second possible implementation manner of the sixth aspect, when the login interface is a login interface corresponding to a website, the right information corresponds to the website; or when the login interface is a login interface corresponding to an application, the right information corresponds to the application.

In the embodiments of the present invention, the server can query, according to the login information, right information corresponding to a user and feed back the right information to the client, so that the client can control a right of the login account, that is, the client controls a right of each login account, which does not cause too much pressure on the server; after the right information is fed back to the client, the client can directly control the right of each login account, and it is unnecessary to implant too much code; therefore, this implementation manner is simpler and more convenient for practical application.

DETAILED DESCRIPTION

In embodiments of the present invention, a right control method may include: acquiring, by a client, login information input by a user; sending, by the client, the login information to a server, where the login information is used by the server to query right information corresponding to the login information; and receiving, by the client, the right information sent by the server, and controlling, by the client, access right of a login account according to the right information, where the login account is an account corresponding to the login information.

In the embodiments of the present invention, the server can query, according to the login information, right information corresponding to a user, and feed back the right information to the client, so that the client can control a right of the login account, that is, the client controls a right of each login account, which does not cause too much pressure on the server; after the right information is fed back to the client, the client can directly control the right of each login account, and it is unnecessary to implant too much code; therefore, this implementation manner is simpler and more convenient for practical application.

Various aspects are described in this specification with reference to a client and/or a server.

The client may be a wireless client or a wired client. The wireless client may refer to a device that provides a user with voice and/or data connectivity, a handheld device with a wireless connection function, or another processing device connected to a radio modem. The wireless client may communicate with one or more core networks by using a radio access network (RAN, Radio Access Network). The wireless client may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (Personal Communications Service, PCS) phone, a cordless telephone set, a Session Initiation Protocol (SIP) phone, a wireless local loop (WLL, Wireless Local Loop) station, or a personal digital assistant (Personal Digital Assistant, PDA). The wireless client may also be referred to as a system, a subscriber unit (Subscriber Unit), a subscriber station (Subscriber Station), a mobile station (Mobile Station), a mobile device (Mobile Device), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The server, for example, may be a web server, or may be another server.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exists, and only B exists. In addition, the character "/" in this specification generally indicates an "or" relationship between the associated objects.

The following further describes the embodiments of the present invention in detail with reference to accompanying drawings in this specification.

Figure 1:
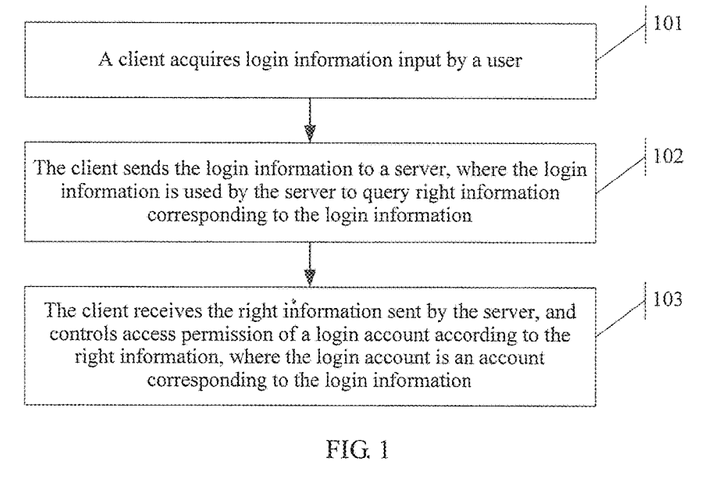
FIG. 1 is a main flowchart of a right control method on a client according to an embodiment of the present invention.

Referring to FIG. 1, an embodiment of the present invention provides a right control method. A main process of the method is described as follows:

Step 101: A client acquires login information input by a user.

Optionally, in this embodiment of the present invention, that a client acquires login information input by a user may include: the client displays a login interface, where the login interface is a login interface of a website, or the login interface is a login interface of an application; and the client acquires the login information that the user inputs by using the login interface.

Optionally, in this embodiment of the present invention, the login interface may be a login interface of a website, or the login interface may be a login interface of an application, such as a game application or an office application.

For example, for some websites, a user needs to perform some background settings. For example, in a campus network, login accounts of an administrator, a teacher, and a student are distinguished from each other and have different rights; or for example, on a company website, an administrator, leaders at all levels, and common staff are distinguished from each other, and different login accounts also have different rights. A user generally needs to provide login information when logging in to this type of website.

For example, it is also necessary to distinguish rights from each other for some applications. For example, login accounts of players and administrators at different levels are distinguished from each other and have different rights. A user generally needs to provide login information when logging in to this type of application.

Regardless of whether the user logs in to a website or an application, an interface on which the user inputs the login information may be referred to as the login interface.

Upon accessing the login interface by using the client, the user needs to input a login account and a password, where the login account and the password of the user are the login information of the user, and the login account may be referred to as a login account of the login information. The present invention sets no limitation to specific forms of the login account and the password. For example, the login information may be voice information, fingerprint information, or text information.

Step 102: The client sends the login information to a server, where the login information is used by the server to query right information corresponding to the login information.

After obtaining the login information, the client may send the login information to the server; and after receiving the login information, the server may query the right information corresponding to the login information.

Optionally, the server may store a correspondence list, and the correspondence list includes a correspondence between login information and right information that are of each login account, where one piece of login information corresponds to one piece of right information, and one piece of login information corresponds to one login account.

Optionally, in this embodiment of the present invention, when the login interface is a login interface corresponding to a website, the right information corresponds to the website; when the login interface is a login interface corresponding to an application, the right information corresponds to the application.

In this embodiment of the present invention, if the login interface is a login interface corresponding to a website, the login information and the website are corresponding to each other, where a meaning of "corresponding" is: The right information refers to right information that is corresponding to the login information and that is for all right elements included in the website, and the website is a website to which a user logs in by using the login information and by using the login interface. For example, the website includes multiple interfaces, where all or some of interfaces include different right elements, that is, the website includes multiple right elements. The right information includes the right information that is corresponding to the login information and that is for all the right elements included by the website. All rights that are corresponding to the login information and for the website can be learned by acquiring the right information.

Similarly, in this embodiment of the present invention, if the login interface is a login interface corresponding to an application, the login information and the application are corresponding to each other, where a meaning of "corresponding" is: The right information refers to right information that is corresponding to the login information and that is for all right elements included in the application, and the application is an application to which a user logs in by using the login information and by using the login interface. For example, the application includes multiple interfaces, where all or some of interfaces have different right elements, that is, the application includes multiple right elements. The right information includes the right information that is corresponding to the login information and that is for all the right elements included in the application. All rights that are corresponding to the login information and for the application can be learned by acquiring the right information.

After receiving a piece of login information, the server may query the correspondence list for the login information. If the login information is found, the server may feed back right information corresponding to the login information to the client. If the server does not find the login information, the server may feed back a response message to the client, indicating that the login information is not found, and the client may not control a right of the login account, or the client may directly reject access by the login account.

A website may include multiple web pages, that is, the website includes multiple interfaces; for a login account, right information corresponding to the login account may cover rights corresponding to the login account on all interfaces included in the website. That is, right information of a login account covers a scope of all rights corresponding to the login account of the website, so that the server needs to send only the right information to the client, and the client can control a right of the login account according to the right information regardless of an interface on which a user performs an operation using the login account.

Similarly, an application may also include multiple interfaces; for a login account, right information corresponding to the login account may cover rights corresponding to the login account on all interfaces included in the application. That is, right information of a login account covers a scope of all rights corresponding to the login account of the application, so that the server needs to send only the right information to the client, and the client can control a right of the login account according to the right information regardless of an interface on which a user performs an operation using the login account.

Step 103: The client receives the right information sent by the server, and controls access right of a login account according to the right information, where the login account is an account corresponding to the login information.

After receiving the right information, the client can control the access right of the login account according to the right information.

For example, a website may include multiple right elements, where the right elements can be used to control an access scope; different content can be accessed by performing an operation on different right elements. Therefore, access right of each login account can be controlled by controlling the right elements. A right element may be, for example, a button or a link.

If a login account has a right for a right element, information about the right element is included in right information corresponding to the login account. If a login account has no right for a right element, information about the right element is not included in right information corresponding to the login account.

Optionally, in this embodiment of the present invention, that the client controls access right of a login account according to the right information includes: the client determines information about a right element included in each interface of the website; the client determines, according to the right information, whether there is information about a right element, wherein the information is in the determined information about a right element but is not included in the right information; and when there is information about a right element that is not included in the right information, the client forbids displaying of the right element corresponding to the information about the right element that is not included in the right information.

Then, when receiving the right information, the client can determine information about all right elements included in the website or the application, that is, information about a right element included in each interface belonging to the website or the application. After determining the information about these right elements, the client can determine, according to the right information, whether there is information about a right element, wherein the information is in the determined information about a right element but is not included in the right information. If there is information about a right element that is not included in the right information, it indicates that the login account has no operation right for the right elements.

If the client determines that there is information about a right element that is in the determined information about the right elements but is not included in the right information, the client can forbid displaying of the right element corresponding to the information about the right elements. That is, if it is determined that the login account has no operation right for a right element, the client can directly forbid displaying of the right element, so that a user using the login account obviously cannot perform an operation on the right element. In addition, the client directly forbids displaying of a right element for which the login account has no right, so that each user can see only a right element for which the user has operation permission, and the user does not perform an operation on a right element for which the user has no right, which reduces operation time of the user and avoids a misoperation of the user. Furthermore, a user having no right cannot see corresponding information, which prevents a user from performing a malicious attack on a system, and ensures security of the system to the greatest extent.

Optionally, in this embodiment of the present invention, that the client controls access right of a login account according to the right information includes: the client determines information about a right element included in each interface of the website or the application; the client determines, according to the right information, whether there is information about a right element, wherein the information is in the determined information about a right element but is not included in the right information; and when there is information about a right element that is not included in the right information, the client forbids enabling of the right element corresponding to the information about the right element that is not included in the right information.

When receiving the right information, the client can determine information about all right elements included by the website or the application, that is, information about a right element included in each interface belonging to the website or the application. After determining the information about these right elements, the client can determine, according to the right information, whether there is information about a right element, wherein the information is in the determined information about a right element but is not included in the right information. If there is information about a right element that is not included in the right information, it indicates that the login account has no operation right for the right elements.

If the client determines that there is information about a right element that is in the determined information about the right elements but is not included in the right information, the client can forbid enabling of the right element corresponding to the information about the right elements. That is, if it is determined that the login account has no operation permission for a right element, the client can forbid enabling of the right element, so that a user using the login account cannot perform an operation on the right element. Forbidding enabling of the right element may mean that the right element is still displayed but may be displayed in an inoperative state, and after seeing this state, a user naturally knows that the right element cannot be operated. In this way, a display effect of an entire page is not damaged; meanwhile, the user is reminded so that the user will not perform a misoperation.

Optionally, in this embodiment of the present invention, if only enabling the right element is forbidden, and the right element still continues to be displayed, there may be various specific display manners. For example, the right element may be displayed in a highlighted state; the right element may be displayed in a color different from that of another right element, where the another right element may refer to a right element for which the login account has a right; or the right element may be endowed with a display identifier when being displayed. In conclusion, these display manners aim to remind a user that the right element cannot be operated, so as to prevent the user from performing a misoperation.

Optionally, in this embodiment of the present invention, a website or an application includes multiple right elements; before step 101, a right customized attribute may be pre-configured for all or a part of the right elements, so that the client can control a right element for which the customized attribute is configured.

For example, for a right element for which the customized attribute is configured, the client can forbid displaying of the right element or forbid enabling of the right element; however, for a right element for which the right customized attribute is not configured, the client may not be capable of performing similar control over the right element.

For example, a website includes three right elements in total, which are respectively a right element 1, a right element 2, and a right element 3, where a right customized attribute is pre-configured for the right element 1 and the right element 2, while the right customized attribute is not configured for the right element 3. When receiving the right information, the client can determine information about all right elements included by the website, that is, determine information about the right element 1, information about the right element 2, and information about the right element 3. After determining the information about these right elements, the client can determine, according to the right information, whether there is information about a right element, wherein the information is in the determined information about a right element but is not included in the right information; if there is information about a right element that is not included in the right information, it indicates that the login account has no operation permission for the right elements.

For example, the client determines that the information about the right element 1 and the information about the right element 3 are not included in the right information. Because the right customized attribute is pre-configured for the right element 1, the client can control the right element 1, for example, the client can forbid displaying or forbid enabling of the right element 1, so that a user cannot perform an operation on the right element 1. However, because the right customized attribute is not pre-configured for the right element 3, the client cannot control the right element 3, and the right element 3 may be still normally displayed.

It can be learned that, the right customized attribute may be configured for a right element that needs to be controlled, where the right element that needs to be controlled may be only a part of all right elements, so as to reduce workload required for configuration. In addition, a right element that can be controlled and a right element that cannot be controlled are distinguished from each other by configuring the right customized attribute, which is more convenient for performing control.

Figure 2:
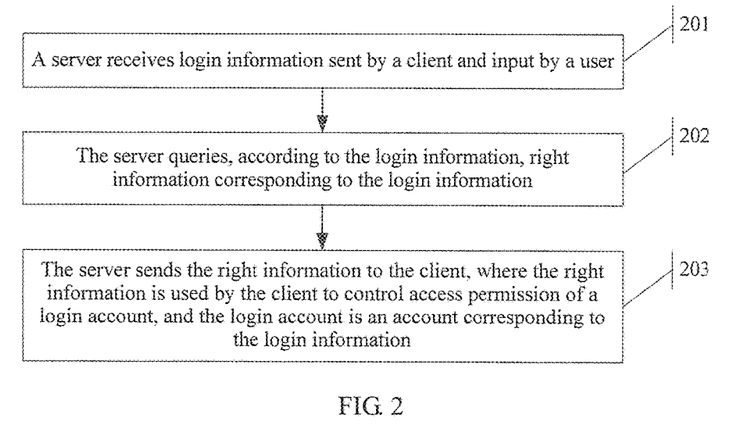
FIG. 2 is a main flowchart of a right control method on a server according to an embodiment of the present invention.

Referring to FIG. 2, based on a same inventive concept, an embodiment of the present invention provides another rights control method, where the method may be applied on a server, and the server may be the server described above. A main procedure of the method is described as follows:

Step 201: The server receives login information sent by a client and input by a user.

Optionally, in this embodiment of the present invention, that the server receives login information sent by a client and input by a user may include: the server receives the login information that is sent by the client and input by the user by using a login interface, where the login interface may be a login interface of a website, or the login interface may be a login interface of an application, such as a game application or an office application.

Optionally, in this embodiment of the present invention, when the login interface is a login interface corresponding to a website, right information corresponds to the website; or when the login interface is a login interface corresponding to an application, the right information corresponds to the application.

Regardless of whether the user logs in to a website or an application, an interface in which the user inputs the login information may be referred to as the login interface.

When entering the login interface by using the client, the user needs to input a login account and a password, where the login account and the password of the user are login information of the user, and the login account is referred to as a login account of the login information. The present invention sets no limitation to specific forms of the login account and the password, for example, the login information may be voice information, fingerprint information, or text information.

After obtaining the login information, the client may send the login information to the server.

Step 202: The server queries, according to the login information, right information corresponding to the login information.

Optionally, the server may store a correspondence list, where the correspondence list includes a correspondence between login information and right information that are of each login account, and one piece of login information corresponds to one piece of right information.

Optionally, in this embodiment of the present invention, when the login interface is a login interface corresponding to a website, the right information corresponds to the website; or when the login interface is a login interface corresponding to an application, the right information corresponds to the application.

In this embodiment of the present invention, login information is in one-to-one correspondence with a website; similarly, login information is also in one-to-one correspondence with an application. That is, the right information mentioned in this embodiment of the present invention refers to right information that is of one login account and for one website, where the website is a website to which a user logs in by using the login account and by using the login information; or the right information mentioned in this embodiment of the present invention refers to right information that is of one login account and for one application, where the application is an application to which a user logs in by using the login account and by using the login information.

After receiving a piece of login information, the server may query the correspondence list and search for the login information in the correspondence list. If finding the login information, the server may send right information corresponding to the login information to the client; or, if the server does not find the login information, the server may send a response message to the client, indicating that the login information is not found, and the client may not control a right of the login account, or the client may directly reject access of the login account.

Step 203: The server sends the right information to the client, where the right information is used by the client to control access right of a login account, and the login account is an account corresponding to the login information.

After finding the right information corresponding to the login information, the server can feed back the right information to the client. The manner in which the client controls the access right of the login account has been described in detail in the procedure shown in FIG. 1, and details are not described herein again.

Figure 3:
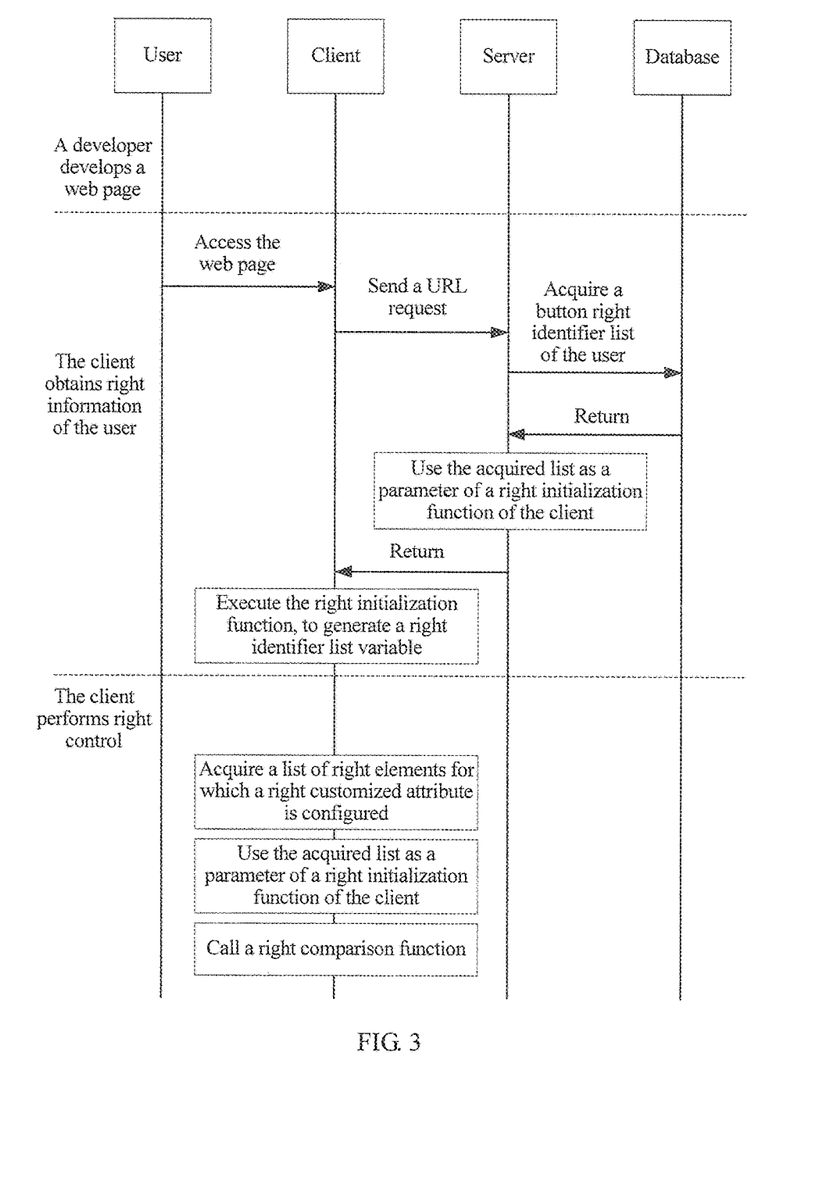
FIG. 3 is an interaction flowchart of a user, a client, and a server according to an embodiment of the present invention.

Referring to FIG. 3, FIG. 3 is an interaction flowchart of a user, a client, and a server according to an embodiment of the present invention. An example that a login interface is a login interface corresponding to a website is used in the embodiment of FIG. 3, where the user herein may be understood as a login account used by the user.

First, a website developer can develop a web page, for example, a right control framework may be introduced to add a right customized attribute, so that the client can control a corresponding right element according to whether the login account has a right. In this embodiment of the present invention, a website may include multiple right elements. Optionally, a right customized attribute may be added to each right element, so that each right element can be displayed; or a right customized attribute is added to only some right elements that are relatively important, so that the implementation is simpler.

A user accesses a web page by using a browser installed on the client; when accessing a website, the user enters a login interface of the website and inputs login information, where the login information corresponds to the login account. The client sends a URL request to the server, where the URL request carries the login information of the user.

The server may perform a query in a database, where the database may store correspondence list, and the database determines that the login information corresponds to a piece of right information in the correspondence list, that is, determines a button right identifier list corresponding to the login account, where the button right identifier list includes all right elements for which the login account has a right. The database feeds back a query result to the server, and the server may feed back acquired right information (referred to as a right list in the figure), that is, the button right identifier list, as a parameter of a right initialization function of the client to the client; the client may execute the right initialization parameter and generate a right identifier list variable, that is, the client determines which rights the login account has; and the client may acquire a list of elements for which a right customized attribute is configured, that is, the client may acquire information about a right element that is on the website and has a right customized attribute. The client may call a right comparison function to determine information about a right element that is on the website but is not included in the right information, so as to perform rights control.

In FIG. 3, the server and the database are shown separately, that is, the database may not be located on the server, but the database may be controlled by the server; or the database may be located on the server.

Optionally, this embodiment of the present invention may be mainly applied to a web system. For typical implementation, generally Java programming language is used on a server, and HTML (Hypertext Markup Language)/JavaScript (network script language) is used on a client. The following describes the technical solutions of the present invention by using Java and HTML/JavaScript as an example.

The client adds a right customized attribute mappingid to a right element, where the right customized attribute is assigned as a right identifier of a function point corresponding to the right element.

A user logs in to a website by using a browser installed on the client, the user inputs login information, the login information corresponds to a login account, and the client sends the login information to the server.

The server acquires right information of the login account from the database, stores the right information of the login account into a Session (session) of the user, and assigns the right information of the login account to the client by using a JSTL (JSP Standard Tag Library, JSP Standard Tag Library) tag, where generally the right information may be a right list and include a right that the login account has, that is, include information about each right element that the login account can operate.

The client acquires the right information of the login account from the server by using the JSTL tag, and the client converts the right information into a client variable.

For example, addprivilegeId is a right initialization function of the client, where the function divides incoming right information into arrays and saves the arrays to a JavaScript array variable privilegeMappingidList of the client.

After a web page is completely loaded, the client acquires an right element for which a right customized attribute is configured, and calls a right comparison function (filterPrivilege).

For example, a document.ready event definition function is used to acquire a list of right elements for which a right customized attribute mappingid is configured, and the list is transmitted to the right comparison function for processing.

The right comparison function acquires a value of a right customized attribute of each right element and determines whether the value of the right customized attribute of each right element exists in the privilegeMappingidList array; if a value of a right customized attribute of one right element of the right elements exists in the privilegeMappingidList array, it indicates that the login account has operation right for the right element, and the right element can be displayed or enabled for the login account; if a value of a right customized attribute of one right element of the right elements does not exist in the privilegeMappingidList array, it indicates that the login account has no operation permission for the right element, and the right element is not displayed or enabled for the login account.

Figure 4:
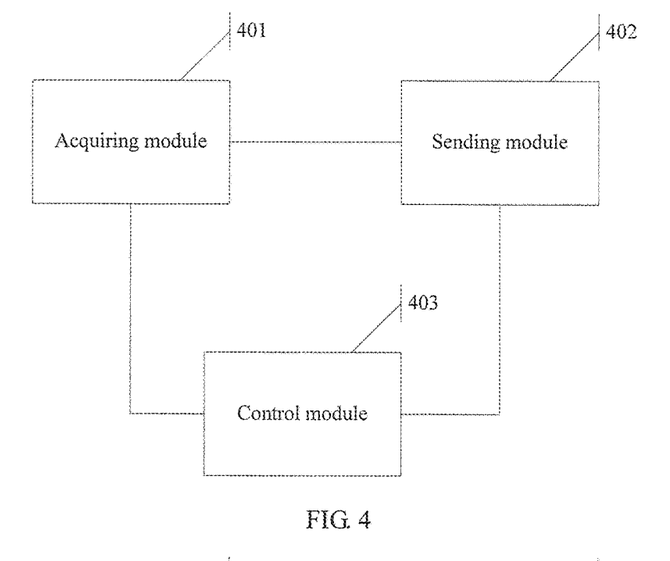
FIG. 4 is a block diagram of a structure of a client according to an embodiment of the present invention.

Referring to FIG. 4, based on a same inventive concept, an embodiment of the present invention provides a client, where the client may include an acquiring module 401, a sending module 402, and a control module 403.

The acquiring module 401 may be configured to acquire login information input by a user.

The sending module 402 may be configured to send the login information to a server, where the login information is used by the server to query right information corresponding to the login information.

The control module 403 may be configured to receive the right information sent by the server, and control access right of a login account according to the right information, where the login account is an account corresponding to the login information.

Optionally, in this embodiment of the present invention, the acquiring module 401 may be specifically configured to: display a login interface, where the login interface is a login interface of a website, or the login interface is a login interface of an application; and acquire the login information that the user inputs by using the login interface.

Optionally, in this embodiment of the present invention, when the login interface is a login interface corresponding to a website, the right information corresponds to the website; or when the login interface is a login interface corresponding to an application, the right information corresponds to the application.

Optionally, in this embodiment of the present invention, that the control module 403 may be specifically configured to control the access right of the login account according to the right information is specifically: determining information about a right element included in each interface of the website or the application, determining, according to the right information, whether there is information about a right element, wherein the information is in the determined information about a right element but is not included in the right information, and when there is information about a right element that is not included in the right information, forbidding displaying of the right element corresponding to the information about the right element that is not included in the right information.

Specifically, in this embodiment of the present invention, the control module 403 may include:

a determining submodule, configured to determine the information about the right element included in each interface of the website or the application; a judging submodule, configured to determine, according to the right information, whether there is information about a right element, wherein the information is in the determined information about a right element but is not included in the right information; and a display forbidding submodule, configure to: when there is information about a right element that is not included in the right information, forbid displaying of the right element corresponding to the information about the right element that is not included in the right information.

Optionally, in this embodiment of the present invention, that the control module 403 may be specifically configured to control the access right of the login account according to the right information is specifically: determining information about a right element included in each interface of the website or the application, determining, according to the right information, whether there is information about a right element that is in the determined information about the right element but is not included in the right information, and when there is information about a right element that is not included in the right information, forbidding enabling of the right element corresponding to the information about the right element that is not included in the right information.

Specifically, in this embodiment of the present invention, the control module 403 may include:

a determining submodule, configured to determine the information about the right element included in each interface of the website or the application; a judging submodule, configured to determine, according to the right information, whether there is information about a right element that is in the determined information about the right element but is not included in the right information; and an enabling forbidding submodule, configure to: when there is information about a right element that is not included in the right information, forbid enabling of the right element corresponding to the information about the right element that is not included in the right information.

Figure 5:
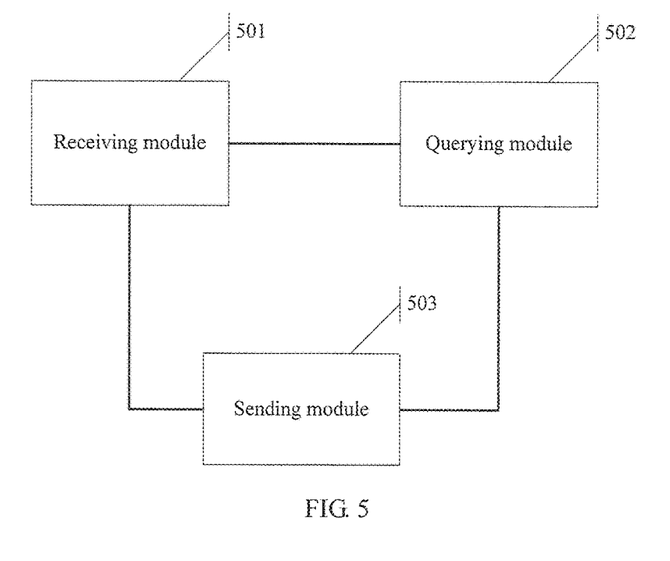
FIG. 5 is a block diagram of a structure of a server according to an embodiment of the present invention.

Referring to FIG. 5, based on a same inventive concept, an embodiment of the present invention provides a server, where the server may include a receiving module 501, a querying module 502, and a sending module 503.

The receiving module 501 may be configured to receive login information sent by a client and input by a user.

The querying module 502 may be configured to query, according to the login information, right information corresponding to the login information.

The sending module 503 may be configured to send the right information to the client, where the right information is used by the client to control access right of a login account, and the login account is an account corresponding to the login information.

Optionally, in this embodiment of the present invention, the receiving module 501 may be specifically configured to receive the login information that is sent by the client and input by the user by using a login interface, where the login interface is a login interface of a website, or the login interface is a login interface of an application.

Optionally, in this embodiment of the present invention, when the login interface is a login interface corresponding to a website, the right information corresponds to the website; or when the login interface is a login interface corresponding to an application, the right information corresponds to the application.

Figure 6:
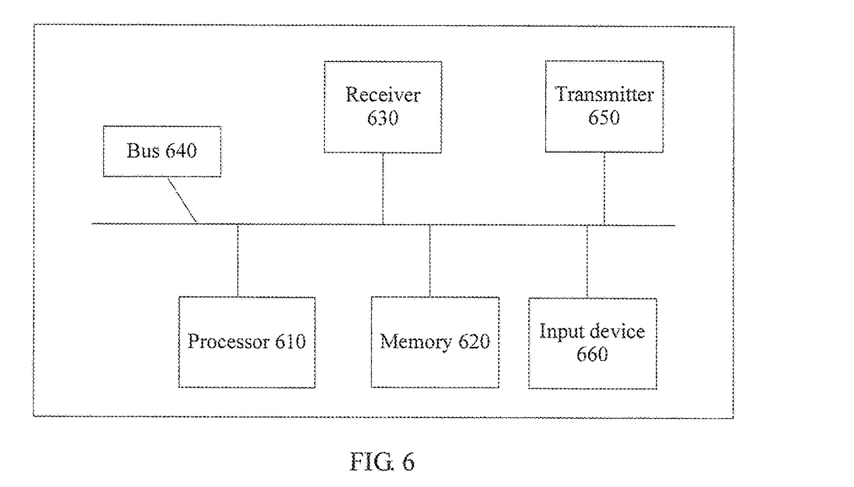
FIG. 6 is a schematic diagram of a structure of a client according to an embodiment of the present invention.

Referring to FIG. 6, based on a same inventive concept, an embodiment of the present invention provides a client, where the client may be the client described above. The client includes: a bus 640, and a processor 610, a memory 620, a receiver 630, a transmitter 650, and an input device 660 that are connected to the bus 640, where: the memory 620 is configured to store an instruction; the input device 660 is configured to acquire login information input by a user; the transmitter 650 is configured to send the login information to a server, where the login information is used by the server to query right information corresponding to the login information; the receiver 630 is configured to receive the right information sent by the server; and the processor 610 is configured to execute the instruction, and control access right of a login account according to the right information, where the login account is an account corresponding to the login information.

Optionally, in this embodiment of the present invention, the client may further include a display connected to the bus 640. The display may be configured to display a login interface, where the login interface is a login interface of a website, or the login interface is a login interface of an application; the input device 660 may be specifically configured to acquire the login information that is input by the user by using the login interface.

Optionally, in this embodiment of the present invention, when the login interface is a login interface corresponding to a website, the right information corresponds to the website; or when the login interface is a login interface corresponding to an application, the right information corresponds to the application.

Optionally, in this embodiment of the present invention, the processor 610 is specifically configured to: execute the instruction; determine information about a right element included in each interface of the website or the application; determine, according to the right information, whether there is information about a right element that is in the determined information about the right element but is not included in the right information; and when there is information about a right element that is not included in the right information, forbid displaying of the right element corresponding to the information about the right element that is not included in the right information.

Optionally, in this embodiment of the present invention, the processor 610 is specifically configured to: execute the instruction; determine information about a right element included in each interface of the website or the application; determine, according to the right information, whether there is information about a right element that is in the determined information about the right element but is not included in the right information; and when there is information about a right element that is not included in the right information, forbid enabling of the right element corresponding to the information about the right element that is not included in the right information.

Figure 7:
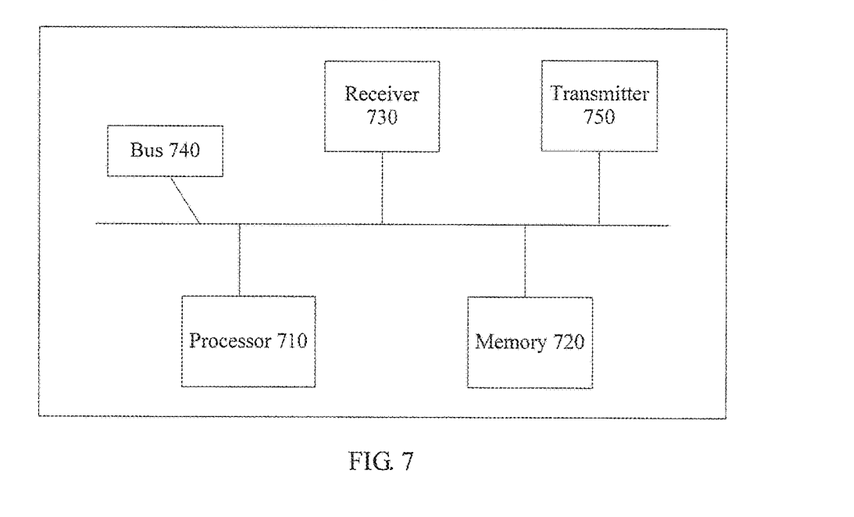
FIG. 7 is a schematic diagram of a structure of a server according to an embodiment of the present invention.

Referring to FIG. 7, based on a same inventive concept, an embodiment of the present invention provides a server, where the server may be the server described above. The server includes: a bus 740, and a processor 710, a memory 720, a receiver 730, and a transmitter 750 that are connected to the bus 740, where: the memory 720 is configured to store an instruction; the receiver 630 is configured to receive login information sent by a client and input by a user; the processor 610 is configured to execute the instruction, and query, according to the login information, right information corresponding to the login information; and the transmitter 650 is configured to send the right information to the client, where the right information is used by the client to control access right of a login account, and the login account is an account corresponding to the login information.

Optionally, in this embodiment of the present invention, the receiver 630 is specifically configured to receive the login information that is sent by the client and input by the user by using a login interface, where the login interface is a login interface of a website, or the login interface is a login interface of an application.

Optionally, in this embodiment of the present invention, when the login interface is a login interface corresponding to a website, the right information corresponds to the website; or when the login interface is a login interface corresponding to an application, the right information corresponds to the application.

In this embodiment of the present invention, the rights control method may include: acquiring, by a client, login information input by a user; sending, by the client, the login information to a server, where the login information is used by the server to query right information corresponding to the login information; receiving, by the client, the right information sent by the server, and controlling, by the client, access right of a login account according to the right information, where the login account is an account corresponding to the login information.

In the embodiments of the present invention, the server can query, according to the login information, right information corresponding to a user and feed back the right information to the client, so that the client can control a right of the user, that is, the client controls the right of the user, which does not cause too much pressure on the server; after the right information is fed back to the client, the client can directly control the right of the user, and it is unnecessary to implant too much code; therefore, this implementation manner is simpler and more convenient for practical application. In addition, if the server controls the right of the user, the server is under too much pressure, and the server can control the right of the user only after the client transmits information to the server, which requires more control time; however, if the client directly controls the right of the user, time for information transmission is saved, and correspondingly control efficiency is improved.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely used to describe in detail the technical solutions of the present application. The descriptions of the foregoing embodiments are merely intended to help understand the method and core idea of the present invention, and shall not be construed as a limitation to the present invention. Any variation or replacement readily figured out by a person skilled in the art within the technical scope disclosed in the present invention shall fall within the protection scope of the present invention.

What is claimed is:

1. A right control method, comprising:
    displaying, by a client, a login interface, wherein the login interface is a login interface of a website, or the login interface is a login interface of an application;
    acquiring, by the client, login information input by a user by using the login interface;
    sending, by the client, the login information to a server, wherein the login information is used by the server to query right information corresponding to the login information;
    receiving, by the client, the right information sent by the server; and
    controlling, by the client, access right of a login account according to the right information, wherein the login account is an account corresponding to the login information, including:
        determining, by the client, information about a right element comprised in each interface of the website or the application;
        determining, by the client, according to the right information, whether there is information about a right element, wherein the information is in the determined information about a right element but is not comprised in the right information; and
        preventing, by the client, the display of the right element corresponding to the information about a right element that is not comprised in the right information when there is information about the right element that is not comprised in the right information.

2. The method according to claim 1, wherein when the login interface is a login interface of a web site, the right information corresponds to the web site; or
    when the login interface is a login interface of an application, the right information corresponds to the application.

3. A right control method, comprising:
    displaying, by a client, a login interface, wherein the login interface is a login interface of a website, or the login interface is a login interface of an application;
    acquiring, by the client, login information input by a user by using the login interface;
    sending, by the client, the login information to a server, wherein the login information is used by the server to query right information corresponding to the login information;
    receiving, by the client, the right information sent by the server; and
    controlling, by the client, access right of a login account according to the right information, wherein the login account is an account corresponding to the login information, including:
        determining, by the client, information about a right element comprised in each interface of the website or the application;
        determining, by the client according to the right information, whether there is information about a right element, wherein the information is in the determined information about a right element but is not comprised in the right information; and
        preventing, by the client, enabling of the right element corresponding to the information about a right element that is not comprised in the right information when there is information about the right element that is not comprised in the right information.

4. A client, comprising: a memory, an input device, a receiver, a transmitter, an output device; and a processor, wherein: the memory connects to the processor, the output device connects to the processor; the input device connects to the processor, the receiver connects to the processor, and the transmitter connects to the processor;
    the output device is configured to display a login interface, wherein the login interface is a login interface of a website, or the login interface is a login interface of an application;
    the memory is configured to store an instruction;
    the input device is configured to acquire login information input by a user by using the login interface;
    the transmitter is configured to send the login information to a server, wherein the login information is used by the server to query right information corresponding to the login information;
    the receiver is configured to receive the right information sent by the server; and
    the processor is configured to:
        execute the instruction, and control access right of a login account according to the right information, wherein the login account is an account corresponding to the login information;
        determine information about a right element comprised in each interface of the website or the application;
        determine, according to the right information, whether there is information about a right element, wherein the information is in the determined information about a right element but is not comprised in the right information; and
        prevent displaying of the right element corresponding to the information about the right element that is not comprised in the right information when there is information about a right element that is not comprised in the right information.

5. The client according to claim 4, wherein when the login interface is a login interface corresponding to a website, the right information corresponds to the web site; or
    when the login interface is a login interface corresponding to an application, the right information corresponds to the application.

6. A client, comprising: a memory, an input device, a receiver, a transmitter, an output device; and a processor, wherein: the memory connects to the processor, the output device connects to the processor; the input device connects to the processor, the receiver connects to the processor, and the transmitter connects to the processor;

the output device is configured to display a login interface, wherein the login interface is a login interface of a website, or the login interface is a login interface of an application;

the memory is configured to store an instruction;

the input device is configured to acquire login information input by a user by using the login interface;

the transmitter is configured to send the login information to a server, wherein the login information is used by the server to query right information corresponding to the login information;

the receiver is configured to receive the right information sent by the server; and the processor is configured to:

execute the instruction, and control access right of a login account according to the right information, wherein the login account is an account corresponding to the login information;

determine information about a right element comprised in each interface of the website or the application;

determine, according to the right information, whether there is information about a right element, wherein the information is in the determined information about a right element but is not comprised in the right information; and prevent displaying of the right element corresponding to the information about a right element that is not comprised in the right information when there is information about the right element that is not comprised in the right information.

7. A non-transitory computer readable medium, wherein the non-transitory computer readable medium stores a program, and wherein the program performs the following operations:

displaying, by a client, a login interface, wherein the login interface is a login interface of a website, or the login interface is a login interface of an application;

acquiring, by the client, login information input by a user;

sending, by the client, the login information to a server, wherein the login information is used by the server to query right information corresponding to the login information;

receiving, by the client, the right information sent by the server; and controlling, by the client, access right of a login account according to the right information, wherein the login account is an account corresponding to the login information, including:

determining, by the client, information about a right element comprised in each interface of the website or the application;

determining, by the client, according to the right information, whether there is information about a right element, wherein the information is in the determined information about a right element but is not comprised in the right information; and prevent, by the client, the display of the right element corresponding to the information about a right element that is not comprised in the right information when there is information about the right element that is not comprised in the right information.

8. A non-transitory computer readable medium, wherein the non-transitory computer readable medium stores a program, and wherein the program performs the following operations:

displaying, by a client, a login interface, wherein the login interface is a login interface of a website, or the login interface is a login interface of an application;

acquiring, by the client, login information input by a user by using the login interface;

sending, by the client, the login information to a server, wherein the login information is used by the server to query right information corresponding to the login information;

receiving, by the client, the right information sent by the server; and controlling, by the client, access right of a login account according to the right information, wherein the login account is an account corresponding to the login information, including:

determining, by the client, information about a right element comprised in each interface of the website or the application;

determining, by the client according to the right information, whether there is information about a right element, wherein the information is in the determined information about a right element but is not comprised in the right information; and preventing, by the client, enabling of the right element corresponding to the information about a right element that is not comprised in the right information when there is information about the right element that is not comprised in the right information.

* * * * *